United States Patent [19]  [11] 4,153,550
Lautrette  [45] May 8, 1979

[54] METHOD AND APPARATUS FOR THE CONTINUOUS FILTRATION OF MATERIAL IMPREGNATED WITH LIQUID

[75] Inventor: Jean-Claude Lautrette, Ville D'Avray, France

[73] Assignee: Societe Nouvelle des Filtres Philippe, Saint-Cloud, France

[21] Appl. No.: 862,162

[22] Filed: Dec. 19, 1977

[30] Foreign Application Priority Data

Dec. 21, 1976 [FR] France ............................... 76 38473

[51] Int. Cl.² ............................................. B01D 33/04
[52] U.S. Cl. ..................................... 210/66; 100/151; 100/177; 162/297; 162/313; 210/70; 210/77; 210/138; 210/350; 210/386; 210/401
[58] Field of Search ..................... 210/66, 77, 70, 138, 210/141, 142, 143, 153, 160, 297, 324, 350, 386, 400, 401; 100/151, 152, 155, 153, 154, 177; 162/297, 308, 312, 313

[56] References Cited

U.S. PATENT DOCUMENTS

| 3,084,987 | 4/1963 | Bounin | 210/350 |
| 3,190,451 | 6/1965 | Holland | 210/251 |
| 3,356,014 | 12/1966 | Alenius | 100/177 |
| 3,481,376 | 12/1969 | Keller | 100/177 |
| 3,744,543 | 7/1973 | Emmett | 210/68 |
| 3,870,641 | 3/1975 | Pierson | 210/400 |
| 4,008,158 | 6/1975 | Davis | 210/386 |

Primary Examiner—Frank Sever
Attorney, Agent, or Firm—Oblon, Fisher, Spivak, McClelland & Maier

[57] ABSTRACT

The present invention relates to a method and apparatus for the continuous filtration of material impregnated with liquid. This method is characterized in that pressure is exerted discontinuously on successive portions of the material to be filtered travelling continuously such that this pressure is applied to each portion of the material as it moves, over a predetermined distance, after which the pressure is no longer applied to this portion in order to be applied to the following portion of material.

15 Claims, 7 Drawing Figures

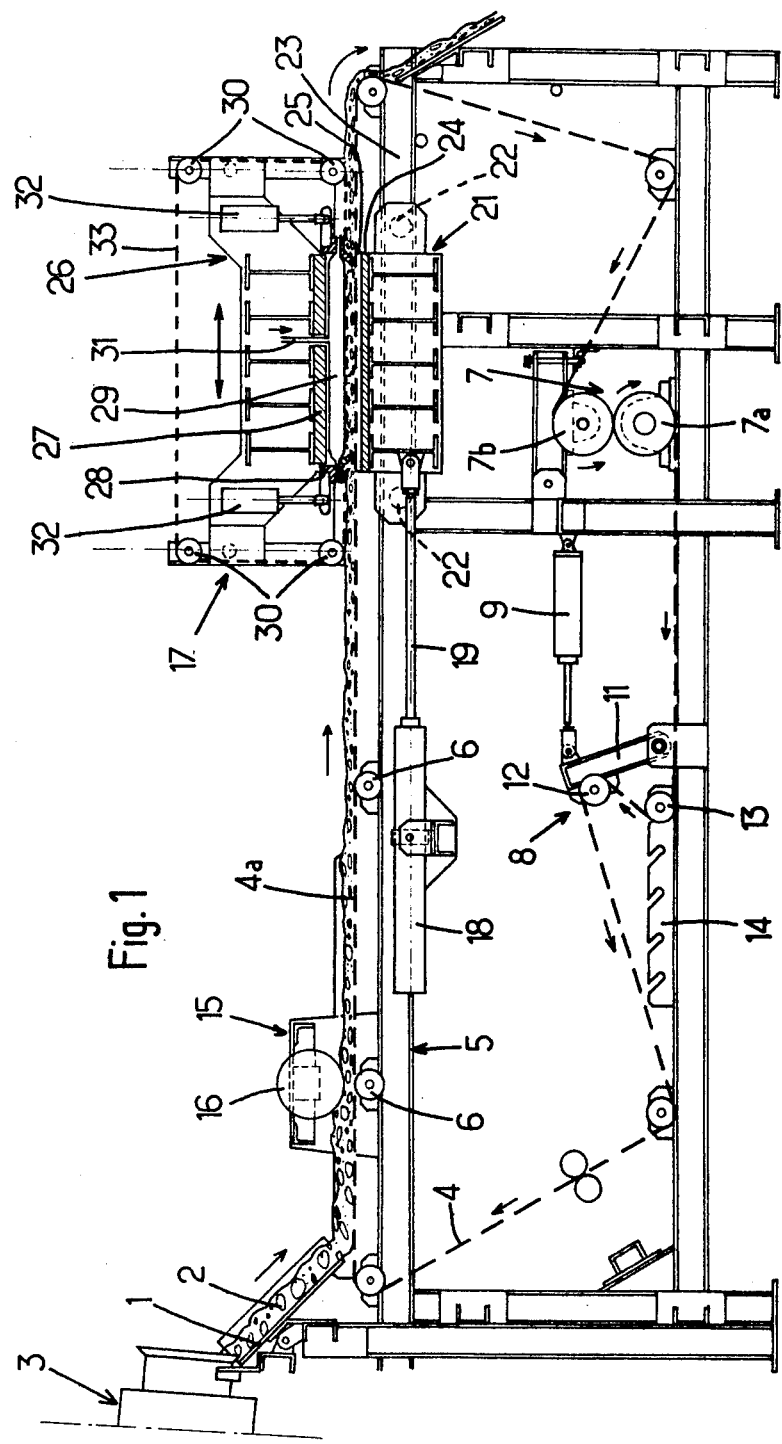

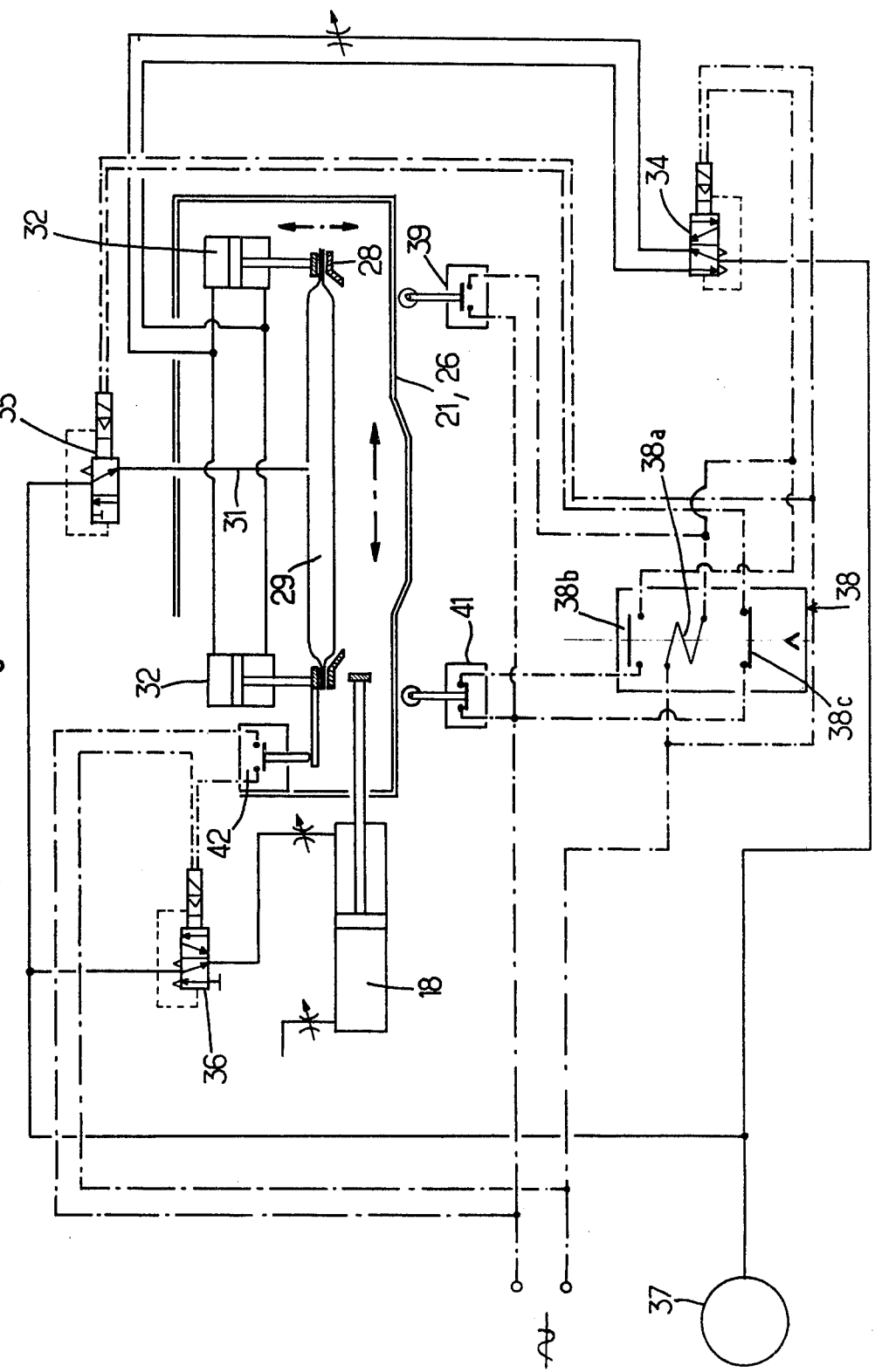

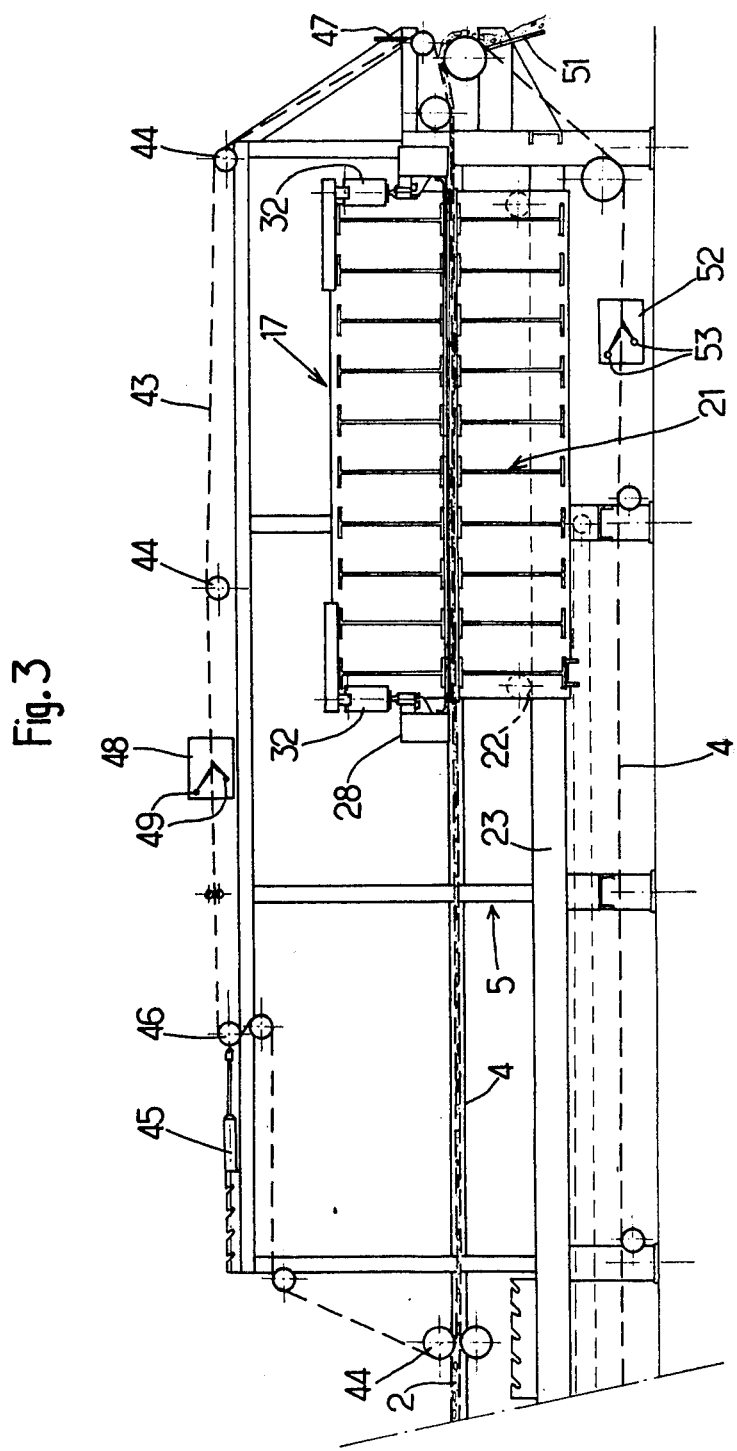

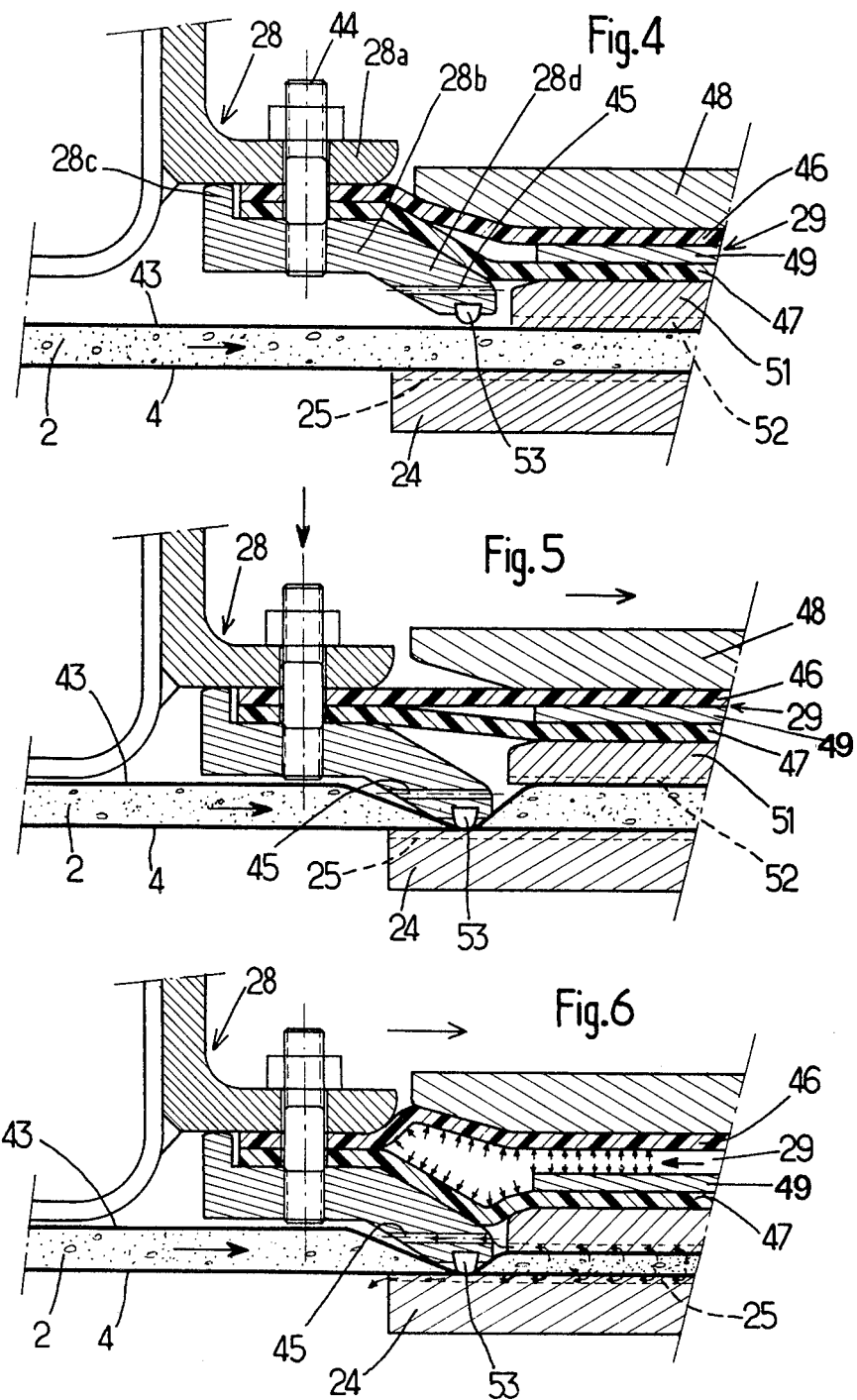

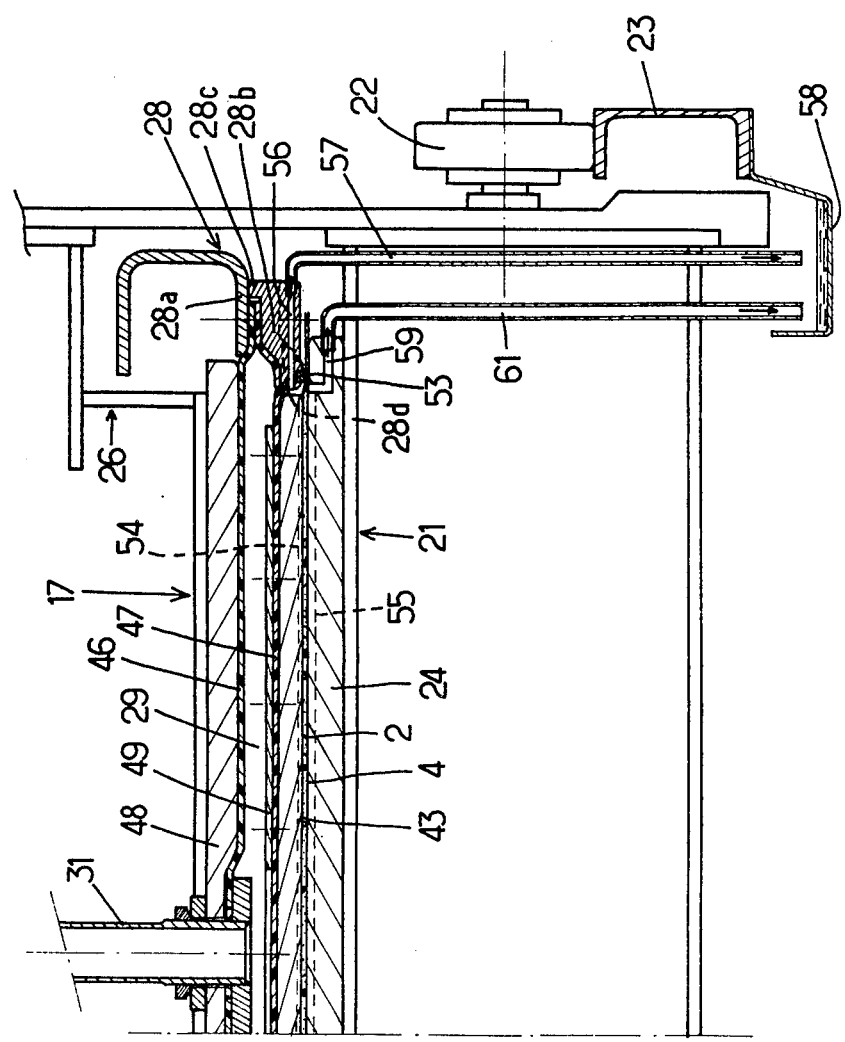

METHOD AND APPARATUS FOR THE CONTINUOUS FILTRATION OF MATERIAL IMPREGNATED WITH LIQUID

BACKGROUND OF THE INVENTION

1. Field of the Invention

The present invention relates to a method and apparatus for the continuous filtration of material impregnated with liquid.

2. Description of the Prior Art

Different methods and apparatuses are already known for the filtration of various materials, in particular sludges, operating continuously or discontinuously.

In a known filtration apparatus of the continuous type, the material to be filtered is passed between two bands one of which is permeable, these two bands being pressed one against the other under pressure. This method of filtration has the drawback that it is hardly possible to apply a very high pressure to the material to be filtered, since the latter is not enclosed in a sealed chamber and, if the pressure were too high, this would result in lateral leakages. Limitation of the pressure which can be exerted thus causes a correlative limitation of the overall output which can be achieved by the filtration apparatus.

Other filtration apparatus operate discontinuously: the latter are filter presses. These filter presses make it possible to exert a much higher pressure on the material to be filtered than in an apparatus operating continuously, this pressure being able to reach 15 bars. On the other hand, they have a very long cycle time, which may be of the order of 3 hours, this cycle time corresponding to the duration of complete filling of the chambers and to that for undoing or opening the filter, for the purpose of emptying the cake, this operation itself being followed by re-closing of the filter. These apparatuses have the drawback that the opening operation thereof, whether carried out manually or automatically, takes up a major part of the cycle time, during which the filter is not operational and in all cases requires the presence of an operator From the point of view of dryness (ratio between the weight of dry material and the total weight of the filtered sludge), the continuous method using a band makes it possible to achieve dryness of the order of 25%, whereas a filter press makes it possible to achieve greater dryness, of the order of 40 to 45% for example.

SUMMARY OF THE INVENTION

The present invention intends to remedy the drawbacks of the known methods and apparatuses, whilst preserving their respective advantages and this is accomplished by a combination of very simple means.

To this end, this method for the continuous filtration of a material impregnated with liquid, of the type in which said material is placed on a conveyor belt carrying out a continuous movement and during the movement of the material on the conveyor, pressure is exerted on this material in order to expel the liquid contained in the latter, is characterized in that the pressure is exerted discontinuously on successive portions of the material to be filtered travelling continuously such that this pressure is applied to each portion of the material as it moves over a predetermined distance, after which the pressure is no longer applied to this portion in order to exert the pressure on the following portion of material.

The invention also relates to an apparatus for the continuous filtration of a material impregnated with liquid, comprising a conveyor belt carrying out a continuous movement and on which the material is placed and a press exerting its action on said material placed on the conveyor belt in order to expel the liquid contained in the latter, characterized in that it comprises means for imparting to the press a cyclic movement comprising, in a first stage, the application of pressure to the material impregnated with liquid and the movement of the press in synchronism with the belt and, in a second stage, the release of pressure and return of the press to its initial point.

The method and apparatus according to the invention offer the advantage that it is possible to apply a very high pressure, which may be of the order of that used in filter presses, to the material impregnated with liquid. Furthermore, owing to the fact that the method and apparatus make it possible to carry out filtration of the material impregnated with liquid in a perfectly continuous manner, without having to provide periodic operations for opening the filter, as in the case of filter presses, one obtains a very high output, clearly greater than those of currently known filters. Furthermore, the present invention makes it possible to adjust the dryness which it is desired to obtain, as necessary, since in fact, it is sufficient to regulate the pressure exerted on the material impregnated with liquid and the duration of the first cycle time during which this pressure is effectively applied to the material.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 1 is a diagrammatic elevational view, partly in vertical section, of an apparatus for the continuous filtration of sludge according to the invention;

FIG. 2 is an electrical and pneumatic circuit diagram of the circuits for controlling the apparatus shown in FIG. 1;

FIG. 3 is a diagrammatic elevational view of a variation of the apparatus;

FIGS. 4, 5 and 6 are views in partial vertical section, an enlarged scale, of the movable press.

FIG. 7 is a half view in cross section of the apparatus.

DETAILED DESCRIPTION OF THE PREFERRED EMBODIMENTS

The apparatus for continuous filtration according to the present invention, illustrated in FIG. 1, comprises an inclined chute 1 which supplies material 2 impregnated with liquid, for example sludge which is to be filtered. The humidity may already have been partly removed from this sludge 2 in a drainage device. The chute 1 supplies the sludge 2 to be filtered onto an endless conveyor belt 4 mounted on a frame 5 of the apparatus. This conveyor belt 4, which is permeable to water, may be constituted by a filter cloth, a fine mesh screen etc. The conveyor belt 4 passes over a certain number of rollers 6 mounted to rotate on the frame 5 and forms an upper horizontal side 4a moving from the left where the sludge 2 to be filtered arrives, towards the right in the drawing, on the upper part of the frame 5. A device 7 for driving the conveyor belt 4 is located in the lower part of the frame 5, this device being constituted essentially by two rollers of large diameter, applied under pressure one against the other and between which the conveyor belt passes thus forming a type of S. One of the cylinders, for example the lower cylinder 7a is rotated, whereas the upper cylinder 7b is applied under pressure against the lower cylinder, by an appropriate spring which is not shown. The lower part of the conveyor belt 4 also passes through a tensioning device 8. This device 8 comprises a ram 9 acting on a pivoting chassis 11 supporting in its upper part, a return roller 12 over which the conveyor belt 4 passes. The tensioning device 8 also comprises a lower roller 13 whose shaft may be located at will, along the length of the belt, in one of several notches of a rack 14. Thus, the belt 4 which leaves the drive device 7, passes under the lower roller then rises in order to pass below and around the upper roller 12, thus forming a loop as it were. The upper roller 12 is pulled towards the right by the ram 9 in order to ensure tensioning of the conveyor belt 4.

A continuous movement is thus imparted to the conveyor belt 4 and it moves the sludge 2 delivered through the chute 1 towards the right in FIG. 1. This sludge is first supplied to an equalizing device 15 which comprises essentially a roller 16 having a horizontal and transverse axis, mounted to rotate on a frame above the upper side 4a of the conveyor belt. On leaving the equalizing device 15, the layer of sludge 2 to be filtered on the side 4a of the conveyor belt thus has a depth substantially equal to the gap existing between the roller 16 and the side 4a.

The layer of sludge equalized in this way is then supplied to a press 17 which is mounted to move to and fro horizontally, in the right-hand upper part of the frame 5 of the apparatus. The alternating movement of this press 17 is controlled in its return stage by a ram 18 having a horizontal and longitudinal axis, located in the upper part of the frame 5, below the side 4a of the conveyor belt. The rod 19 of this ram is connected to a lower movable chassis 21 which travels, by means of rollers 22, on longitudinal tracks constituted by upper longitudinal members 23 of the frame 5. In its upper part, the chassis 21 supports a drying plate 24 located just below the upper side 4a of the conveyor belt, this drying plate 24 being provided with longitudinal grooves 25 through which the water resulting from the pressure exerted on the sludge may be discharged, as will be seen hereafter.

Above the side 4a of the conveyor belt, the press 17 also comprises an upper chassis 26 which is connected to the lower chassis 21, laterally with respect to the conveyor belt. This upper chassis 26 comprises a horizontal support plate 27, of rectangular shape, extending transversely above the conveyor belt. Mounted to slide vertically about this support plate 27 is a frame 28 constructed in two parts, namely an upper half frame and a lower half frame. The edges of two membranes constituting an inflatable air chamber 29 are gripped between the two parts of the frame 28. The inside of this air chamber 29 is connected by a pipe 31 to a source of compressed air, as will be seen hereafter.

The vertical movement of the frame 28 supporting the air chamber 29, with respect to the support plate 27, is controlled by rams 32, located vertically, the bodies of which are fixed to the upper chassis 26 and the rods of which are connected to the movable frame 28. These rams 32 may be four in number for example and may be located at the four corners of the rectangular frame 28.

The upper chassis 26 of the movable press 17 also comprises an endless canvas 33 mounted on four rollers 30, having horizontal and transverse axes, arranged at the four corners of the upper chassis 26, of general rectangular shape. The lower side of the canvas 33 passes below the frame 28, thus isolating the air chamber 29 from sludge in this area.

FIG. 2 is a diagram of the electrical and pneumatic circuits for controlling the filtration apparatus shown in FIG. 1. In this diagram, the constituent parts similar to those shown in FIG. 1 are given the same reference numerals. The pneumatic circuit is shown in full line, whereas the electrical circuit is shown in dot-dash lines. The two pneumatic rams 32 controlling the ascent and descent of the movable frame 28 are supplied by means of a pneumatic distributor 34, the air chamber 29 is supplied by another pneumatic distributor 35 and the longitudinal and horizontal ram 18, controlling the horizontal movement of the entire press 17, is in turn supplied by means of a pneumatic distributor 36. All the pneumatic distributors 34, 35, 36 are connected to a source of compressed air 37, by appropriate pipes.

The electrical control circuit comprises a time lag relay 38 to which the pneumatic distributors 34 and 35, on the one hand, a contact 39 detecting the end of forwards travel of the press 17 and a contact 41 detecting the end of the return travel of this press, on the other hand are connected. Another electrical end-of-travel contact 42 is provided on the press in order to detect the arrival of the movable chassis 28 in the upper terminal position. This end of travel contact 42 is connected to the electrical member for controlling the pneumatic distributor 36.

The operation of the apparatus for continuous filtration according to the invention will now be described. The inflatable air chamber 29 constitutes a member which makes it possible to apply a pressure to a predetermined portion of the sludge 2 located on the conveyor belt 4, whilst accompanying this sludge as it moves. In other words, in the filtration method used according to the invention, pressure is exerted in a discontinuous manner on successive portions of the sludge to be filtered, which, travels continuously, such that this pressure is applied to each portion of the mass of sludge as it moves over a predetermined distance, which corresponds to the longitudinal travel of the press 17. Then, pressure is no longer applied to the afore-mentioned portion of the mass of sludge and pressure is next applied to the immediately following portion in the continuous flow of sludge.

In order to consider the operating cycle of the apparatus which has been described, it will be assumed that the press 17 reaches the end of its return travel towards the left, after having completed one stage of applying pressure. At this time, the movable chassis of the press, designated by the numerals 21, 26 in FIG. 2, acts on the end-of-return travel contact 41. This contact which is normally closed is connected in series with a working contact 38b of the relay 38, which is itself connected to the coil of the electro/pneumatic distributor 34, all these components thus being connected in series between the two poles for the supply of alternating electrical current. The relay 38 comprises a coil 38a which is connected in series with the end-of-forwards travel contact 39, which is normally open and the latter is connected to the two poles of the source of current. The junction point between the coil 38a and the end-of-forwards travel contact 39 is itself connected to the junction point between the working contact 38b of the relay 38 and the coil of the distributor 34. As will be seen hereafter, during the return travel of the press 17, the relay 38 is operative and it is maintained in this state by its contact 38b which is thus closed. Thus, at the end of the return travel, the opening of the end-of-travel contact 41 causes the excitation of the relay 38 to be cut-off and the return of the latter to the inoperative position. The maintaining contact 38b thus opens, which causes the excitation of the coil of the distributor 34 to be cut-off. The latter reverses and controls the supply of the two vertical rams 32 from the bottom, which causes the descent of the movable frame 28. As soon as this frame 28 leaves its upper terminal position, the end-of-travel contact 42 opens, thus causing the excitation of the coil of the distributor 36 to be cut-off. The latter is thus reversed such that the bottom and top of the forwards movement ram 18 are connected to the open air and its rod which is connected to the press 17 is entrained towards the right, owing to the fact that this press is moved by the filtering belt 4 which it grips, during the forwards travel.

The relay 38 has a time lag before opening. To this end, it comprises another inoperative contact 38c which has a time lag before opening and which is connected in series with the coil of the distributor 35. Consequently, a certain period of time after the beginning of the descent of the moving frame 28, due to the opening of the end-of-return travel contact 41, the contact 38c opens, thus cutting-off the excitation of the coil of the distributor 35. The latter thus reverses and controls the inflation of the air chamber 29. Thus, the latter is pressurized a certain period of time after the beginning of the forwards travel of the press, when the moving frame 28 is in the extreme lower position. From this time, the air chamber 29 applies a predetermined pressure to the portion of sludge with which it is in contact. This pressure is maintained during the entire forwards travel of the press.

At the end of the forwards travel, the moving chassis 21, 26 causes closure of the end-of-travel contact 39. This closure causes operation of the relay 38 which is maintained in this state by the closure of its contact 38b in series with the end-of-return travel contact 41 which is thus closed. Furthermore, closure of this contact 38b once more causes the coil of the distributor 34 to be supplied with current, which thus reverses and controls the re-ascent of the frame 28. At the end of the upwards travel, the frame 28 controls the closure of the end-of-travel contact 42, thus the supply of current to the coil of the distributor 36 and the supply of the ram 18 with compressed air from the right, which causes the movement of the entire press towards the left, i.e. the return travel of the movable chassis 21, 26. The passage of the relay 38 into the working position causes the opening of the contact 38c, hence cutting-off the excitation of the coil of the distributor 35 and connecting the inside of the air chamber 29 to the atmosphere, which is thus deflated.

Thus, during the return travel, the frame 28 is in the upper position and the air chamber 29 is deflated.

The complete cycle is terminated when the movable chassis 21, 26 once more causes opening of the end-of-return travel contact 41, which initiates the same operations for the next cycle.

Naturally, mechanical upstream and downstream stops are provided for limiting any accidental movement of the movable press beyond the positions of the end-of-travel contacts 39, 41.

The positions of the end-of-travel contacts 39 and 41 can be adjusted longitudinally, adjustment of the end-of-return travel contact 41 making it possible to adjust the overlap.

In the variation of the apparatus according to the invention, shown in FIG. 3, it is the frame 5, and no longer the movable press 17, which supports an upper endless filtering cloth 43 which passes over several horizontal and transverse rollers 44 supported by the frame. This filtering cloth 43 is tensioned by a horizontal and longitudinal ram 45 mounted in the upper part of the frame 5 and which acts on a tensioning roller 46. The endless cloth 43 comprises a lower horizontal side which extends longitudinally just above the layer of sludge to be filtered, which is thus engaged between the two endless cloths 4 and 43. On leaving the filtration apparatus according to the invention, the lower side of the upper cloth 43 is deflected upwards and located at this point is a scraper 47, the end of which is in contact with the cloth 43, in order to clean from the latter particles of sludge which may stick thereto. The upper cloth 43 then forms an upper side which extends longitudinally above the frame 5 and this upper side passes through a box 48 containing nozzles 49 spraying water under pressure onto the cloth 43 in order to wash the latter continuously.

In the same way, the lower endless cloth 4 is deflected downwards, at the outlet of the apparatus and located at this point is a scraper 51 ensuring the removal of the dehydrated sludge. The lower cloth 4 then passes through a box 52 containing nozzles 53 spraying water under pressure onto the cloth 4 in order to clean the latter.

The upper filter cloth 43 is moved by translation when the air chamber 29 applies a pressure to a portion of sludge entrained by the lower cloth 4 and when this press 17 in some way grips the layer of sludge 2 and the cloths 4, 43.

FIGS. 4, 5 and 6 illustrate the manner in which the layer of sludge 2 is compressed at the same time that the press 17 is moved from the left towards the right gripping this layer of sludge 2 between the two cloths 4 and 43.

These figures show the sealing frame 28 which comprises an inner horizontal flange 28a below which extends a counter flange 28b, constituting the lower part of the frame 28 and clamped on the flange 28a, constituting the upper part of the frame 28, by means of screws 44.

At its left-hand end, the counter flange 28b bears under the flange 28a by means of an arm 28c extending vertically upwards and it comprises an arm 28d extending downwards and towards the inside of the frame, this arm being intended to bear, at its end, on the upper cloth 43. This inclined arm 28d is itself provided with longitudinal channels 45 for the discharge of water.

The inflatable air chamber 29 is formed by two horizontal membranes, namely an upper membrane 46 and lower membrane 47, the edges of which are gripped between the flange 28a and the counter flange 28b. The upper membrane 46 is connected to an upper horizontal stiffening plate 48, whereas the lower membrane 47 is gripped between two stiffening plates, namely an upper plate 49 and lower plate 51, the latter being intended to press against the upper cloth 43. In its lower surface, which comes into contact with the upper cloth 43, the lower stiffening plate 51 comprises longitudinal grooves 52 ensuring the discharge of water.

The operation of the press is apparent when examining FIGS. 4, 5 and 6. In FIG. 4, the press is shown as being stationary, the frame 28 and the air chamber 29 being shown as raised into their upper positions. In this position, no pressure is exerted on the layer of sludge 2 which is moved horizontally between the two cloths 4 and 43.

When the frame 28 is lowered (FIG. 5), the downwardly inclined arm 28d of the counter flange 28b grips the upper cloth 43 and presses the latter against the lower cloth 4, in order to define a portion of the layer of sludge 2 on which compression is to take place. Owing to the clamping of the frame 28 on the lower cloth 4, which moves by translation and on the drying plate 24 located just below the cloth 4, the press 17 is thus moved by translation towards the right, by the cloth 4.

FIG. 6 shows compression of the layer of sludge 2 at the time of pressurization of air chamber 29. Since compressed air is introduced between the two membranes 46 and 47, the lower membrane is thus applied under pressure downwards, which causes crushing of the layer of sludge 2. The water leaving the sludge may thus flow towards the outside, firstly following the longitudinal grooves 25 provided in the upper side of the lower drying plate 24 and secondly the longitudinal grooves 52 provided in the lower side of the stiffening plate 51, connected to the lower membrane 47 and also the longitudinal channels or holes 45 provided in the inclined arm 28d of the counter flange 28b.

As can be seen in FIGS. 4 to 6, the inclined arm 28d advantageously supports, on its lower end face, a sealing gasket 53 preventing, at the time of compression, the passage of water towards the upstream side, i.e. towards the layer of sludge 2 which is to be dehydrated.

In the variation illustrated in FIG. 7, the lower stiffening plate 51, fulfilling the function of a drainage plate, comprises on its lower side, transverse grooves 54 and likewise, the lower drainage plate 24 comprises, in its upper side, transverse grooves 55. The filtrate thus flows laterally, during the compression of the layer of sludge 2, in the grooves 54 and 55.

The filtrate coming from the upper transverse grooves 54 flows into the gap formed between the upper drainage plate 51 and the lower part 28b of the frame 28, which is provided with transverse conduits 56 connected by means of pipes 57 to a lower longitudinal chute 58. This chute is fixed to the frame 5 of the machine and its length corresponds to the length covered during the movement of the press 17, or approximately to twice the travel of the latter.

Similarly, transverse pipes 55 provided in the lower drainage plate 24 are connected at their ends to conduits 59 provided in this plate and connected by pipes 61 to the lower chute 58.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for the continuous filtration of material impregnated with liquid, which comprises:

a conveyor belt for carrying out a continuous movement and on which said material is deposited;

a press including a first chassis exerting its action on said material deposited on the conveyor belt in order to expel the liquid contained in the latter;

an endless canvass connected to said first chassis of said press;

means for passing said endless canvass between said first chassis and said material; and, shifting means for imparting to said press a cyclic movement comprising, in a first stage, the application of pressure to the material impregnated with liquid and the movement of the press in synchronism with the belt and, in a second stage, the release of the pressure and the return of the press to its starting point.

2. Apparatus according to claim 1, wherein the press comprises said first chassis and second chassis located respectively above and below the conveyor belt and connected to each other laterally and wheels supported by at least one of these chassis and moving on tracks of the frame of the apparatus, at least one chassis of the first and second chassis being connected to the rod of at least one horizontal and longitudinal ram mounted on the frame of the machine and controlling the movement of the press during its return travel.

3. Apparatus according to claim 2, wherein in its upper part, the second chassis supports a drying plate located just below the upper horizontal side of the conveyor belt, this drying plate being provided, on its upper side, with longitudinal grooves and/or transverse grooves through which the liquid resulting from the pressure exerted on the material to be filtered may be discharged.

4. Apparatus according to claim 2, wherein the first chassis comprises a horizontal support plate extending transversely above the conveyor belt and around which a frame is mounted to slide vertically, which frame is constructed in two parts, namely an upper part and a lower part in that gripped between the two parts of the frame are the edges of two membranes constituting an inflatable air chamber stretched inside the frame and connected by a pipe to a source of compressed air and in that the first chassis comprises at least one vertical ram connected to the movable frame in order to control the ascending and descending movement of the latter with respect to the first chassis.

5. Apparatus according to claim 4, wherein the first chassis supports rollers having transverse horizontal axes, located at the corners of said first chassis and over which passes said endless canvass, the lower side of said canvass passing below the frame so as to isolate the air chamber from the material to be filtered.

6. Apparatus according to claim 5, wherein the lower part of the frame comprises an arm inclined towards the inside of the frame and downwards and which comprises, on the lower end face thereof, a gasket intended to compress the layer of sludge disposed between the conveyor and the endless canvass.

7. Apparatus according to claim 4, which further comprises a tensioning device for tensioning said endless canvass and said endless canvass comprises an endless cloth.

8. Apparatus according to claim 4, wherein the lower membrane is connected to a lower drainage plate comprising on its lower surface, longitudinal grooves and/or transverse grooves for the discharge of the filtrate.

9. Apparatus according to claim 4, which comprises an electrical and pneumatic control circuit comprising a first pneumatic distributor controlling the ascending and descending movement of the movable frame of the press, a second pneumatic distributor controlling the inflation or connection to the open air of the air chamber supported by the frame, also to move vertically and a third pneumatic distributor controlling the supply of current to the ram bringing about the return movement of the movable press, two end-of travel contacts respectively detecting the end-of-forward travel and the end-of-return travel of the movable press, these contacts being connected to a time lag relay and a third end-of-travel contact detecting the arrival of the movable frame in the upper extreme position such that when the movable press reaches the end-of travel position, actuation of the third end-of-return travel contact causes the descent of the movable frame and the reversal of the direction of movement of the press, then, after the expiration of a period of time determined by the time lag relay, inflation of the air chamber and that at the end of forward travel, the actuation of the end-of-travel contact causes the re-ascent of the movable frame, deflation of the air chamber and the reversal of the direction of movement of the movable press.

10. Apparatus according to claim 1, which further comprises a device for driving the conveyor belt mounted in the lower part of the frame comprising two superimposed rollers including an upper roller and a lower roller, at least one of which is rotated, said two rollers being applied one against the other under pressure, the conveyor belt passing over said two rollers so as to form an S-shaped assembly and a device for tensioning the conveyor belt comprising a return roller mounted in one of the notches of a rack and a fourth roller mounted on a pivoting chassis controlled by a tensioning ram, the conveyor belt passing over the return and fourth rollers so as to form a loop.

11. Apparatus according to claim 1 which further comprises means for adjustably tensioning said endless canvass connected to said press.

12. A method for continuous filtration of material impregnated with liquid including a press member having a first chassis and an inflatable air chamber, an endless canvass surrounding said first chassis and a conveyor belt comprising:
 depositing material to be filtered on said conveyor belt;
 continuously moving said conveyor belt;
 shifting said upper chassis of said press so as to exert pressure discontinuously on successive portions of said material deposited on said continuously moving conveyor belt;
 inflating said air chamber; and,
 passing said endless canvass between said first chassis and said material so as to isolate said air chamber from said material.

13. The method as set forth in claim 12 further comprising scraping said endless canvass after said shifting of said endless canvass.

14. The method as set forth in claim 12, further comprising spraying fluid onto said endless canvass after said shifting of said endless canvass so as to clean said endless canvass.

15. A method as set forth in claim 12, further comprising adjustably tensioning said endless canvass.

* * * * *